United States Patent [19]

Nilsson

[11] Patent Number: 4,938,739

[45] Date of Patent: Jul. 3, 1990

[54] EQUIPMENT FOR FOLDING PAPER WEBS AND THE LIKE

[75] Inventor: Mats G. Nilsson, Knivsta, Sweden

[73] Assignee: Sundström Safety AB, Lindingö, Sweden

[21] Appl. No.: 77,902

[22] Filed: Jul. 27, 1987

[51] Int. Cl.⁵ .................... B65H 45/04; B65H 45/10
[52] U.S. Cl. .................................. 493/422; 493/423; 493/451; 493/941
[58] Field of Search ............... 493/422, 423, 436, 441, 493/448, 451, 463, 941

[56] References Cited

U.S. PATENT DOCUMENTS

| | | | |
|---|---|---|---|
| 1,313,712 | 8/1919 | MacFarland | 493/422 |
| 2,072,790 | 3/1937 | Apitzsch et al. | 493/423 |
| 2,709,950 | 6/1955 | Foster et al. | 493/451 |
| 2,901,951 | 9/1959 | Hochfeld | 493/451 |
| 2,984,160 | 5/1961 | Whelton et al. | 493/451 |
| 3,138,077 | 6/1964 | Bauder et al. | 493/941 |
| 3,348,458 | 10/1967 | Tipper | 493/448 |
| 4,012,932 | 3/1977 | Gewiss | 493/941 |
| 4,571,237 | 2/1986 | Vogtlander | 493/416 |
| 4,659,323 | 4/1987 | Ito et al. | 493/457 |
| 4,718,884 | 1/1988 | Iwase et al. | 493/419 |

FOREIGN PATENT DOCUMENTS 1130507A 12/1984 U.S.S.R. .

Primary Examiner—William Terrell
Attorney, Agent, or Firm—Shapiro and Shapiro

[57] ABSTRACT

An apparatus for folding a sheet along concentric circular arcs comprises two series of chain driven comb-shaped folding elements. The folding elements of each series are spaced apart by a distance which is approximately twice the distance between the intended fold locations on the sheet, with the elements of one series being arranged to act against one side of the sheet and the elements of the other series being arranged to act against the other side of the sheet. The folding elements of one series are offset relative to those of the other series a distance equalling the distance between adjacent fold locations on the sheet. The elements of one series increasingly overlap the elements of the other series along the length of the sheet, whereby a plurality of folds are simultaneously being formed progressively as the sheet is fed between the two series of folding elements.

12 Claims, 4 Drawing Sheets

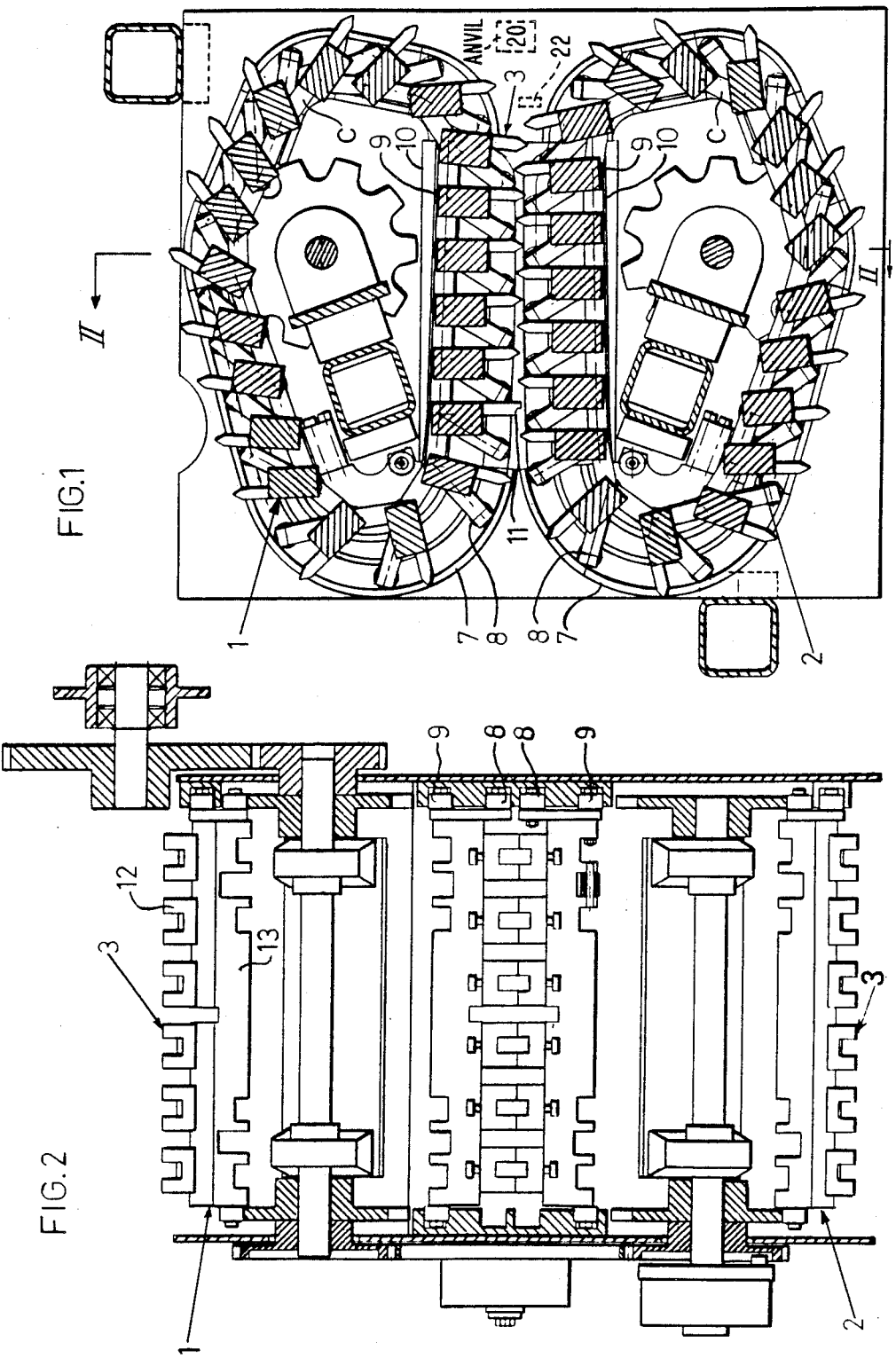

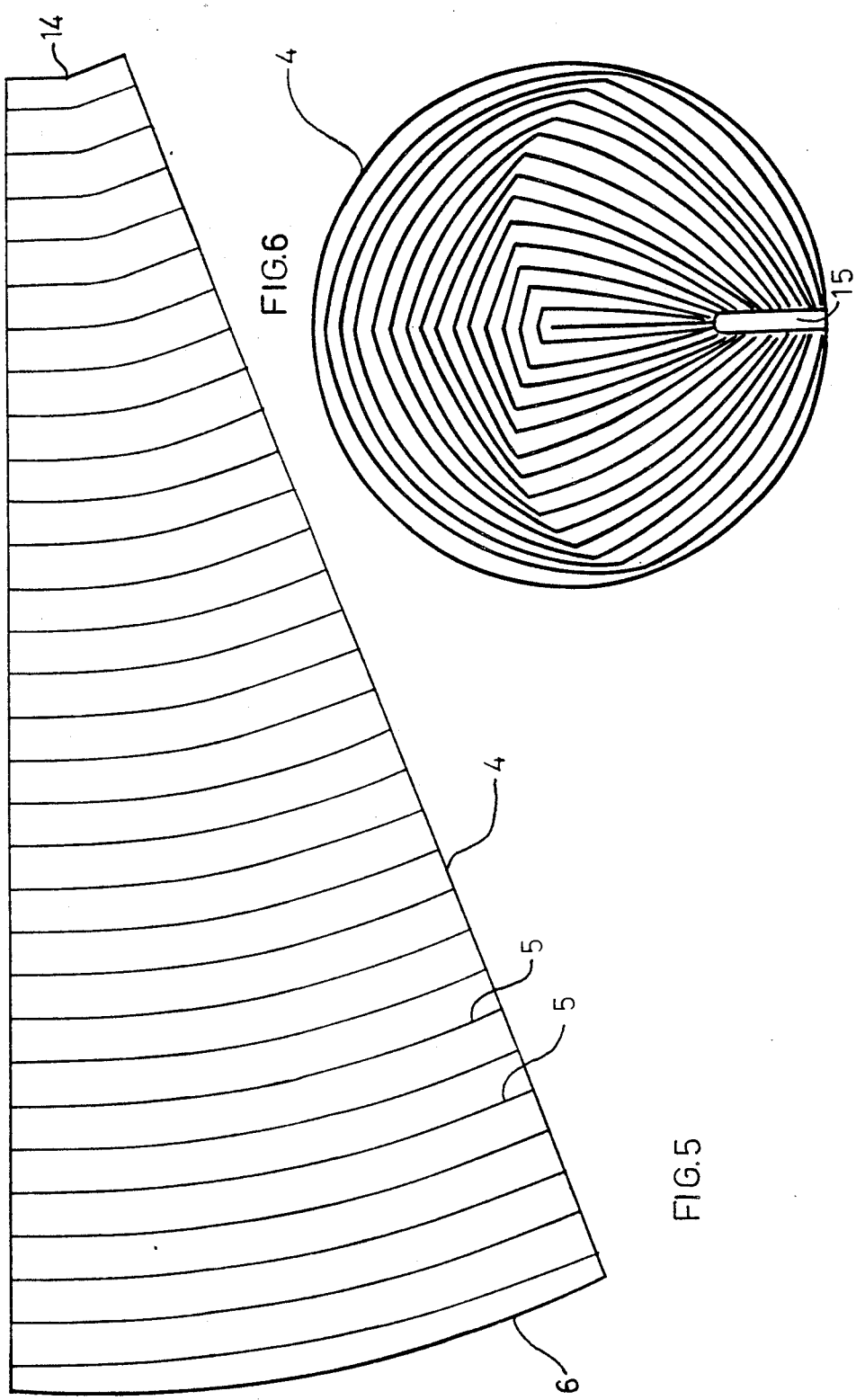

EQUIPMENT FOR FOLDING PAPER WEBS AND THE LIKE

FIELD OF THE INVENTION

The present invention relates to apparatus for folding a sheet of paper and like foldable material along substantially concentric circular arcs.

SUMMARY OF THE INVENTION

The apparatus is, in one of its aspects, characterized in that it comprises two series of feedable comb-shaped folding elements, the elements of each series being spaced apart in the direction of movement by a distance which is approximately twice the distance between the intended fold locations on the sheet, that the elements of one series are arranged to act against one side of the sheet, while the elements of the other series are arranged to act against the other side of the sheet, that the elements of one series are offset relative to those of the other series by a distance equalling the distance between adjacent fold locations on the sheet, and that the element of one series are arranged to increasingly overlap the elements of the other along the length of the sheet such that a plurality of folds are simultaneously being formed progressively as the sheet is fed between the two series of folding elements. The apparatus according to the invention renders it possible to rapidly form concentric folds in the sheet, without exposing the sheet at the same time to the risk of being wrinkled due to the curvature of the folds.

BRIEF DESCRIPTION OF THE DRAWINGS

The invention will be described in greater detail below, reference being had to the accompanying drawings which illustrate an embodiment of the invention and a paper sheet to be folded thereby, and more particularly in which:

FIG. 1 is a longitudinal cross-section of the exemplary embodiment;

FIG. 2 is a transverse cross-section along line II—II in FIG. 1;

FIG. 5 is a top plan view of the sheet to be folded; and

FIG. 6 is a top plan view of the sheet, folded and bent together.

DESCRIPTION OF THE PREFERRED EMBODIMENTS

Figure 3:
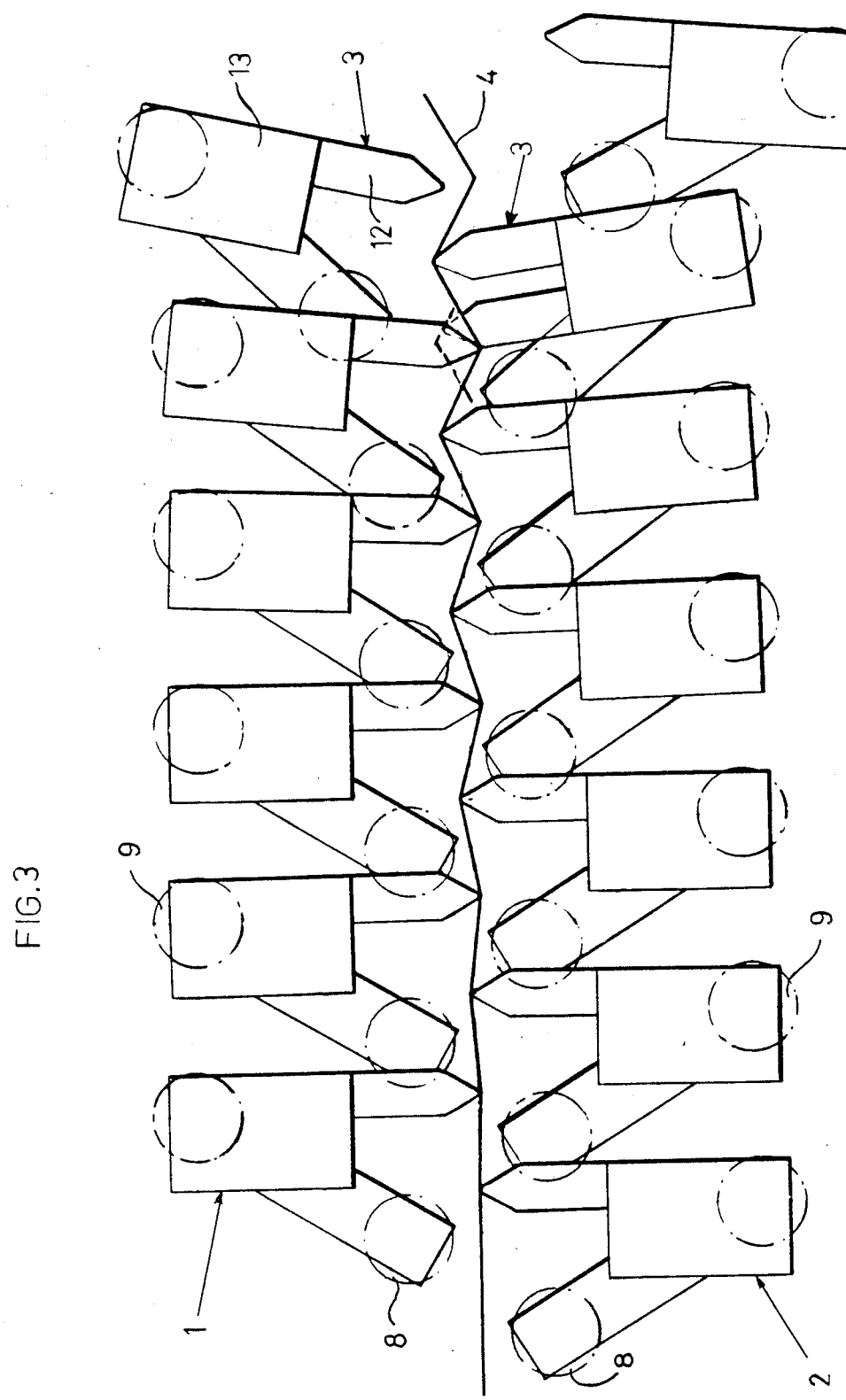
FIG. 3 is an enlarged lateral view of the folding elements acting against the sheet.

The apparatus according to the invention is a machine comprising two series 1 and 2 of feedable folding means in the form of comb-shaped elements 3. The elements 3 of each series 1, 2 are spaced apart by a distance which is approximately twice the distance between the intended fold locations 5 on a sheet 4, as shown in FIG. 5. The elements 3 of the one series 1 are arranged to act against the top face of the sheet 4, while the elements 3 of the other series 2 are arranged to act against the bottom face of the sheet 4. As best seen in FIGS. 1 and 3, the elements 3 of series 1 are offset relative to those of series 2 by a distance equalling the distance between two adjacent fold locations 5 on the sheet 4. Furthermore, the elements 3 of the two series 1, 2 are arranged such that over a distance whose length corresponds to the sheet length for a plurality of folds, the elements of one series increasingly overlap those of the other. As a result a plurality of folds are simultaneously being formed progressively as the sheet 4 is fed between the two series 1, 2. As shown in FIG. 3, in the illustrative embodiment five folds are formed simultaneously, but the number may vary slightly depending on, inter alia, the material of the sheet 4 and the curvature of the folds.

As will be best seen from FIG. 3 (right side), the folding elements 3 are, just beyond the region of overlap, adapted to be quickly removed from the advancing folded sheet 4, such that the sheet may be advanced, free from the folding elements, beyond the machine. According to one preferred mode, the apparatus of the invention may be provided with a slowly moving anvil beyond elements 3 in the sheet feed direction, with which the folded sheet 4 gradually comes into engagement. The anvil, depicted diagrammatically in phantom as box 20 in FIG. 1, will preferably have substantially the same length as the leading edge 6 of the sheet 4, and also substantially the same curvature as the leading edge 6 or the first fold.

Each series 1, 2 of elements 3 is associated with an endless chain C. The respective chains are of equal length and synchronously driven. The angular position of the elements 3 relative to the chains is determined by curved guides 7 cooperating with rollers 8 or the like fixedly connected to the elements 3. As will be further seen from FIG. 1, the elements 3 are provided with rollers 9 which, at least over the region of increasing overlap, cooperate with straight rails 10 which are included towards each other.

In use of the illustrative apparatus, a sheet 4 may be fed between folding elements 3 by a suitable mechanism. Since the folding elements have different shapes, it is important that the sheet 4 enter the folding machine at the correct location. Proper insertion of the sheet may be ensured through the use of a special comb-shapes element 11 having a projecting abutment for the sheet leading edge. If the sheet 4 is short, not all the elements 3 will need to be used.

Figure 4:
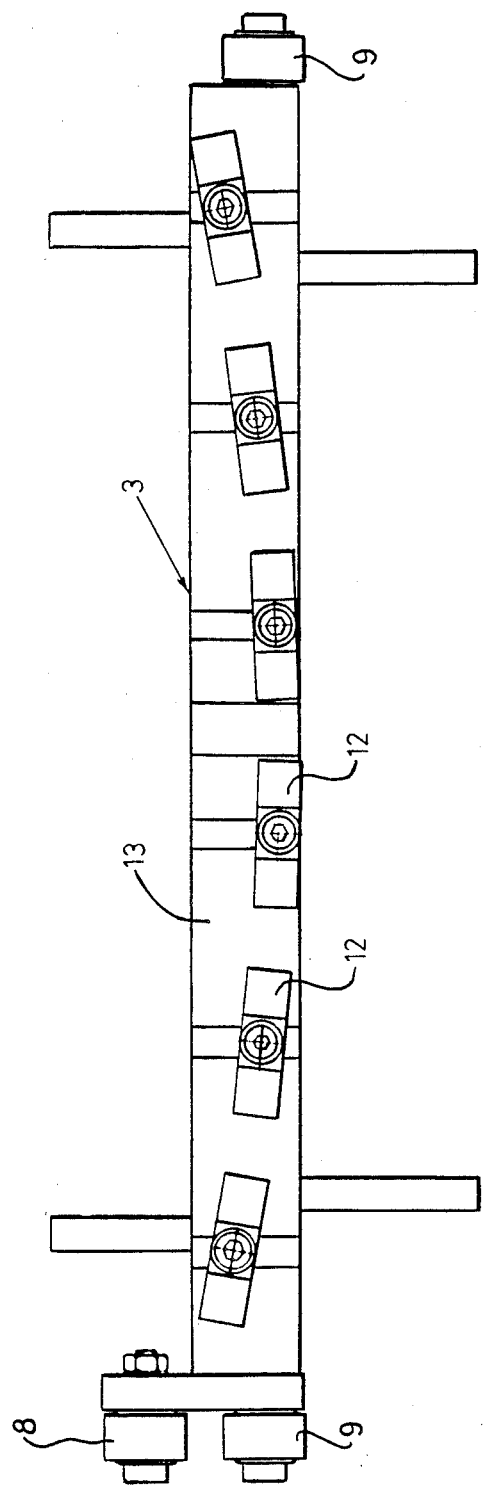
FIG. 4 is a top plan view of one of the folding elements.

As shown in FIG. 4, each folding element 3 preferably comprises a plurality of spaced-apart, short, straight, partial-comb shaped elements 12 which are adjustably attached to a common support 13. This arrangement facilitates adjustment of each element 3 as a whole so as to optimize the folding effect, and of course makes it possible to use the same apparatus to make concentric arcuate folds at different arc radii.

The apparatus of the invention may further be provided with a support member which, after feeding of the folded sheet 4, is adapted to press and/or hold the folded sheet 4 against the anvil 20. The support member is adapted to engage the center portion of the trailing edge 14 of the sheet 4 and preferably is a vertical pin 22 or the like, indicated diagrammatically in phantom in FIG. 1.

The apparatus according to the present invention is particularly intended to fold a sheet 4 of filter material which, as shown in FIG. 5, has the form of a sector of a circle, the sector preferably having an angle of 20°-25°. The sheet or sheet 4 need not be provided with folding indications 5, although this is preferred. Since the filter must be absolutely tight, the folding indications 5 should be designed such that they do not weaken the sheet 4 proper.

After the folding operation in the illustrative machine, the folds of the sheet 4 may be bent together such that their ends abut each other as shown in FIG. 6. In this manner, the sheet 4 of filter material is given a circular form for mounting in a circular filter holder. To make the filter absolutely tight, the space 15 between the ends of the folds is filled with glue or the like. The steps described above can be performed separately or in a machine arranged such that the filters in their holders are manufactured fully automatically. Since each filter must be tested for tightness, this testing would preferably also take place in the machine.

The invention is not limited to the above disclosure, but can be modified within the scope of the appended claims, as will be apparent to those skilled in the art.

What is claimed is:

1. Apparatus for forming substantially parallel arcuate folds in a flat sheet of material, such as paper, moving along a sheet-feed plane, said apparatus comprising:

two series of folding elements, each folding element having arcuate sheet-engagement means for forming a fold along an arc extending transversely to the direction of movement of the sheet between opposite edges of the sheet by engagement with a surface of the sheet along said arc, means supporting the folding elements for translational movement through a sheet folding zone along opposite sides of the sheet-feed plane with the folding elements of one series facing those of the other series across the sheet-feed plane in the folding zone such that their respective sheet-engagement means are substantially parallel to one another, and with the folding elements of one series alternating with the folding elements of the other series in the direction of movement through the folding zone, and means for causing the sheet-engagement means of the folding elements of one series to move relatively toward the folding elements of the other series in a direction substantially perpendicular to the sheet-feed plane so as to increasingly overlap the sheet-engagement means of the folding elements of the other series in such direction as the folding elements translate through the folding zone, such that the sheet-engagement means of the two series of folding elements engage opposite surfaces of the sheet, respectively, and progressively form substantially parallel arcuate folds in the sheet as said overlap increases as the folding elements translate through the folding zone.

2. Apparatus according to claim 1, wherein the sheet-engagement means of each folding element is shaped like an arcuate comb.

3. Apparatus according to claim 2, wherein the sheet-engagement means of each folding element comprises a plurality of straight comb-section-like elements arranged at spaced locations substantially on an arc.

4. Apparatus according to claim 3, wherein the comb-section-like elements are adjustably connected to a common support such that each sheet-engagement means may be adjusted to form folds of different curvatures.

5. Apparatus according to claim 1, including means for causing the overlapped sheet-engagement means to move sharply relatively away from one another as the folding elements move out of the folding zone.

6. Apparatus according to claim 1, wherein said means for causing relative movement of the sheet-engagement means comprises guide means converging along the folding zone in the direction of movement of the folding elements for moving the two series of folding elements progressively toward each other within the folding zone.

7. Apparatus according to claim 1, including a pair of synchronously longitudinally driven endless chains arranged along respective closed paths which face one another across the sheet-feed plane in the folding zone, the folding elements of each series being connected to a corresponding one of said chains at regularly spaced intervals along that chain, and wherein said supporting means includes respective guide means extending around each of said closed paths for guiding the respective series of folding elements along the closed paths as the chains are driven.

8. Apparatus according to claim 7, wherein the guide means guide the two series of folding elements such that the overlapping sheet-engagement means move sharply away from one another and the sheet-feed plane as the folding elements move out of the folding zone.

9. Apparatus according to claim 8, wherein the guide means include respective straight rails engaging the folding elements and converging along the folding zone from opposite sides of the sheet-feed plane.

10. Apparatus according to claim 7, wherein the folding elements of each series have roller means cooperable with the corresponding guide means for controlling the angle of the sheet-engagement means relative to the corresponding chain.

11. Apparatus according to claim 1, including anvil means disposed for abutting a leading edge of the sheet beyond the folding zone.

12. Apparatus according to claim 11, including support pin means disposed for abutting a trailing edge of the sheet beyond the folding zone.

* * * * *